United States Patent [19]

Kurahashi et al.

[11] Patent Number: 5,019,272

[45] Date of Patent: May 28, 1991

[54] METHOD OF WASHING FILTERS HAVING MAGNETIC PARTICLES THEREON

[75] Inventors: Motofumi Kurahashi; Masanori Takemoto; Naoki Chishi; Eizoo Takeuchi; Yoshinori Nakauma, all of Tokai City, Japan

[73] Assignee: Nippon Steel Corporation, Tokyo, Japan

[21] Appl. No.: 503,159

[22] Filed: Mar. 16, 1990

Related U.S. Application Data

[63] Continuation-in-part of Ser. No. 277,243, Nov. 29, 1988.

[30] Foreign Application Priority Data

Nov. 30, 1987 [JP] Japan ................................ 62-302992
Jun. 10, 1988 [JP] Japan ................................ 63-141539

[51] Int. Cl.[5] ................................................ B01D 35/06

[52] U.S. Cl. .................................... 210/695; 210/797; 210/222; 210/223; 210/408; 210/412

[58] Field of Search ............... 210/222, 223, 407, 408, 210/412, 695, 791, 794, 796, 797; 55/3, 100; 209/224, 228, 232

[56] References Cited

U.S. PATENT DOCUMENTS 4,147,632 4/1979 Oder .................................. 210/222
4,594,160 6/1986 Heitmann et al. .................. 210/222

FOREIGN PATENT DOCUMENTS 54-86878 7/1979 Japan .
0145517 11/1980 Japan .................................. 210/695
0728888 4/1980 U.S.S.R. ............................. 210/223

*Primary Examiner*—W. Gary Jones
*Assistant Examiner*—Matthew O. Savage
*Attorney, Agent, or Firm*—Wenderoth, Lind & Ponack

[57] ABSTRACT

A method of removing magnetically-separated magnetic particles adhering to a magnetic filter. Sets of radially-arranged magnets are provided above and below, with adjacent magnets having unlike poles. The filter is located in an alternating magnetic field formed by the magnets. The filter is washed by directing a jet of fluid at it while magnets, or filter, is being rotated.

4 Claims, 10 Drawing Sheets

(a)

(b)

(A)

(B)

(D)

(E)

(C)

(A)

(B)

(D)

(E)

(C)

(a)

(b)

(c)

(A)

(B)

(D)

(E)

(C)

(a)

(b)

METHOD OF WASHING FILTERS HAVING MAGNETIC PARTICLES THEREON

This application is a continuation-in-part, of now abandoned application Ser. No. 07/277,243, filed Nov. 29, 1988.

BACKGROUND OF THE INVENTION

1. Field of the Invention

This invention relates to a method of washing filters that continuously remove magnetic particles, produced by metal processing or wear, that are present in water and in the atmosphere, and also removing microorganisms accompanying magnetism and magnetic particles entrained in fluids.

2. Description of the Prior Art

Magnetic separators employing permanent magnets and electromagnetic or permanent magnetic filters employing ferromagnetic fibers or beads are conventionally used to remove magnetic particles and microorganisms accompanying magnetism entrained in fluids (hereinafter the removal of magnetic particles and the like adhering to electromagnetic filters will also be referred to as "washing").

However, magnetic separators have a poor performance and provide insufficient washing. Electromagnetic filters, on the other hand, have superior magnetic-particle-removal performance but it is necessary to clean the filters effectively. In JP-A-54(1979)-86878, for example, in which a ferroelectromagnet is used to set the magnetic field to zero, a large apparatus is required to free the filter from the magnetic field, involving a large consumption of electricity and a major outlay in manufacturing costs that make the cost-performance thereof unsatisfactory.

Washing water, hydraulic fluid, cooling water, process fluids and other such fluids used in product manufacturing processes in the steel industry, automotive pressed parts and processing industries, for example, contain large quantities of magnetic particles entrained therein. As well as reducing the surface cleanliness of the products, this has a major effect on product quality, producing blemishes and the like, and also because of these magnetic particles, washing tanks and piping has become very costly.

In fresh-water and waterworks treatment facilities also, the formation of rust, iron bacteria and the like from tanks and pipes is unavoidable and is a cause of scale-containing waste water and the like in the waterworks system. Large purification tanks and separation equipment are required to remove this at a huge cost.

Thus, for manufacturing industries, the efficient removal of magnetic particles in such fluids is beneficial in terms of product quality and equipment maintenance costs, and for water treatment facilities it also helps to reduce the equipment costs and to make the water supply safer. However, because such magnetic particles are so small, ordinary filters are quickly clogged, and the cost-performance of conventional magnetic separation apparatuses renders them unsuitable.

In the example of the steel-making industry, minute steel particles produced during the cold-rolling of steel sheet adhere to the sheet. The sheet is therefore subjected to a process to remove the particles, for example, an electric cleaning process, before it is sent on to be heat-treated, plated, and so forth.

Drum-type magnetic separators and cloth filters are generally used to reduce the amount of steel dust in the tanks of rolling oils and washing fluids. However, drum-type magnetic separators have a very low removal efficiency, because the magnetic particles are only held by the magnetic force in the vicinity of the surface of the drum. With cloth filters, too, the minute size of the steel particles makes the removal efficiency lower, in addition to which the filters quickly become clogged, involving large outlays for cloth.

Conventional apparatus include electromagnetic filters that employ ferromagnetic small-gauge wire. Utilizing the principle of high-gradient magnetic separation, a large magnetic gradient is generated around the ferromagnetic small-gauge wires to effect separation of the magnetic particles with good efficiency. However, with current constructions it is difficult to clean the filters. In the cleaning process huge electromagnetic coils are used to control the magnetic field, so the cleaning involves the use of a large apparatus, major fabrication expenditures and the consumption of enormous amounts of electricity. Therefore the major problem is how to remove the magnetic particles adhering to the filters economically and efficiently.

There are apparatuses that combine the low cost of the magnetic separator with the high efficiency of the electromagnetic filter, but the washing efficiency of such apparatuses is poor and high efficiency cannot be maintained over a long period.

SUMMARY OF THE INVENTION

The object of the present invention is to provide a method of cleaning magnetic filters by efficiently removing separated magnetic particles adhering to the magnetic filters.

Another object of the present invention is to provide a method of washing a magnetic filter using centrifugal force, and pulsed washing and an alternating magnetic field.

DETAILED DESCRIPTION OF THE INVENTION

Figure 11:
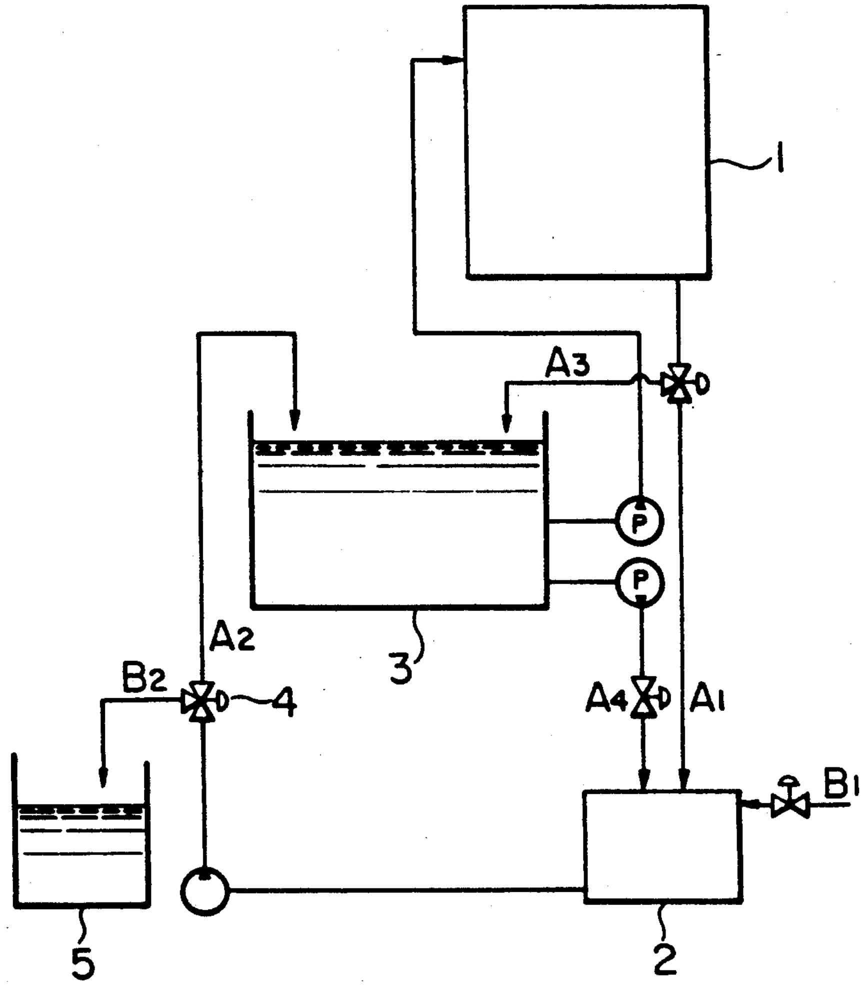
FIG. 11 is diagrammatic view showing a magnetic-particle magnetic separation system.

The magnetic-separation system for removing magnetic particles in a fluid will now be described briefly with reference to FIG. 11.

Rolling oil used in a cold-rolling system 1, for example, contains magnetic particles produced during the cold rolling. The rolling oil is sent via a passage $A_1$ to a magnetic filter 2 where the magnetic particles are removed, after which the cleaned fluid is pumped into a circulation tank 3 via passage $A_2$, and after it has accumulated therein it is again used in the cold-rolling system 1.

In another system the rolling oil used in the cold-rolling system 1 is collected in the tank 3 via a passage $A_3$, and is passed along passages $A_4$and $A_2$, in the course of which the fluid is cleaned by the magnetic filter 2.

Because in both of these fluid cleaning systems the particle-removal capability of the magnetic filter 2 deteriorates over time, the filter has to be cleaned periodically or in response to the deterioration in its particle-removal capability.

To wash the filter, a washing medium (water, steam, oil, etc.) is fed in via passage $B_1$ and the magnetic filter element is rotated at 300 to 3,000 rpm. The magnetic particles expelled thereby pass through passage $B_2$ and are collected in a discharge tank 5. By repeating this process, particles can be continuously removed from the rolling oil with good efficiency.

The present invention comprises expediently washing the filter by removing magnetic particles adhering to the magnetic filter following the use of the filter to remove the magnetic particles from the fluid. For this purpose, the method of the invention comprises disposing magnets above and below the magnetic filter, and with these magnets fixed in place, rotating the magnetic filter to thereby effect the washing of the filter by the centrifugal force on the particles and by the alternating magnetic field thereby generated.

Figure 12:
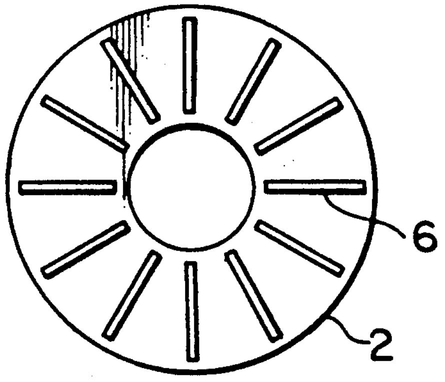
FIG. 12 (PRIOR ART)
FIGS. 12(*a*), 12(*b*) and 13 are explanatory drawings showing conventional filter washing methods.
Figure 12:
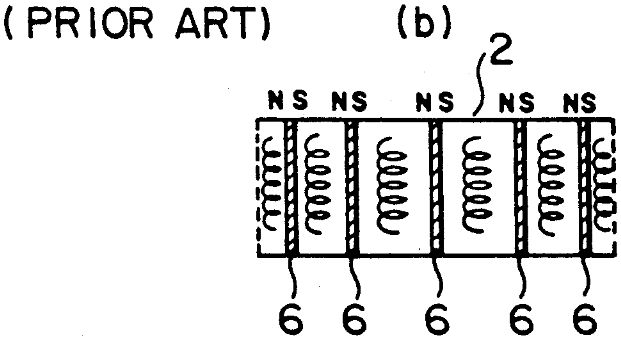
FIG. 12 (PRIOR ART)
Figure 13:
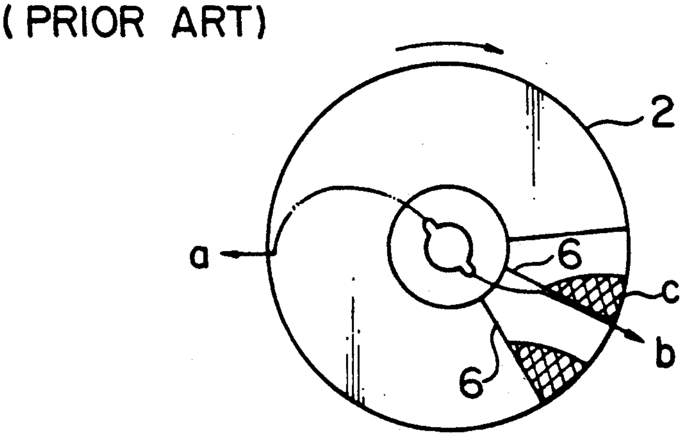
FIG. 13 (PRIOR ART)

Heretofore, as shown by FIG. 12, a magnetic filter 2 in general use is provided with magnets 6 arranged radially in the filter's plane of rotation and in the thickness direction of the filter. When the said magnetic filter 2 is rotated to utilize the centrifugal force thus generated to remove magnetic particles from the filter, the washing fluid applies a fluid drag on the particles that is greater than the magnetic force of the particles. The behavior of the washing fluid is shown in FIG. 13. Namely, when the magnetic filter 2 is rotated the washing fluid describes a parabola, as shown by arrow as it tries to flow in the opposite direction to the rotation, but because it is obstructed by the magnets 6, in the latter half of its flow, as shown by arrow b, it moves along the magnets to leave a stagnant area c, which is a non-cleaning area, and thus, magnetic particles in the filter are unable to be removed completely.

During the washing, when there is no fluctuation in the magnetic field in the filter, the centrifugal force acting on the particles, and the action of only the washing fluid the drag of which has been increased by the centrifugal force, can be cited as causes.of low washing efficiency.

Figure 1:
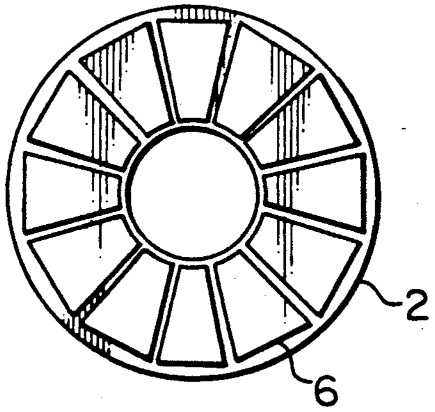
FIGS. 1(*a*) and 1(*b*) are explanatory drawings of the cleaning method according to the present invention.
Figure 1:
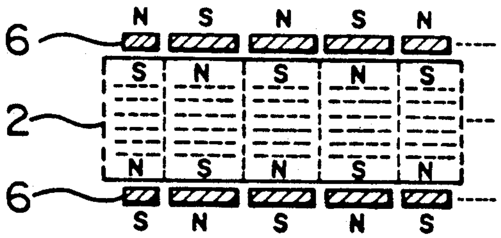

In accordance with the present invention, as shown in FIG. 1, a multiplicity of magnets 6 are disposed above and below the rotating surface of the magnetic filter 2 which is constituted only by ferromagnetic small-gauge wires. With the magnets arranged above and below in a mutually attractive formation and in an alternating-pole formation in the direction of filter rotation, the magnetic field thus formed perpendicularly to the direction of filter rotation and the multiplicity of magnetic fields in the direction of filter rotation produce an alternating magnetic field. Therefore, as shown in FIG. 1(*b*), by having just the filter rotate in the alternating magnetic field, the alternating magnetic field is applied to the filter, enabling the magnetic particles to be removed with good washing efficiency.

Figure 2:
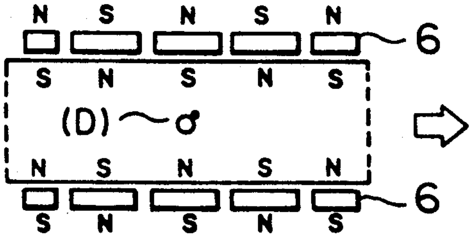
FIG. 2(A) is an explanatory drawing of the interior of the filter.
FIG. 2(B) is an explanatory drawing showing when the filter is cleaned.
FIG. 2(C) is a graph of the alternating magnetic field.
FIG. 2(D) shows a part of the view shown in FIG. 2(A)
FIG. 2(E) shows a part of the view shown in FIG. 2(B)
Figure 2:
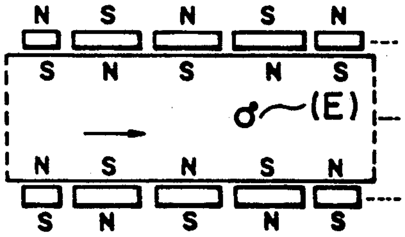
Figure 2:
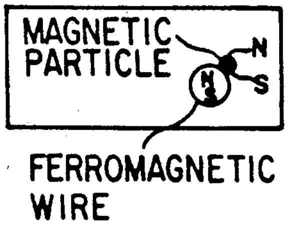
Figure 2:
Figure 2:
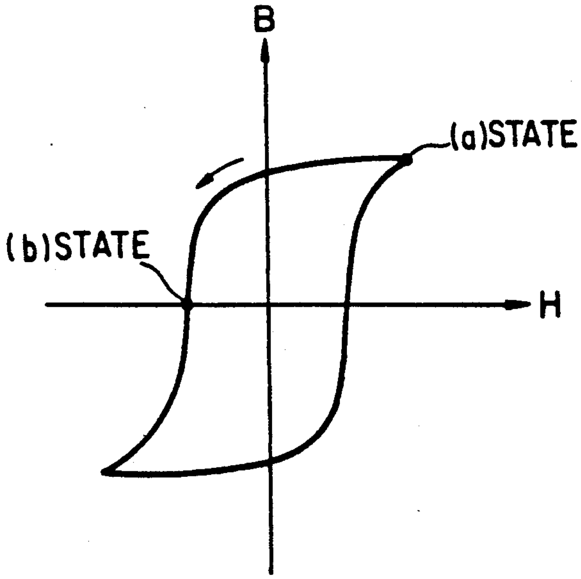

The washing effect according to this invention is shown in FIG. 2. When the ferromagnetic small-gauge wires constituting the filter have the same magnetic characteristics as the magnetic particles to be removed, during filtration, as shown by FIGS. 2(A) and 2(D), the particles are adhering to the ferromagnetic wire, a situation which is shown by state (a) in FIG. 2(C). As shown by FIGS. 2(B) and 2(E), at the start of the washing, there is a chance to degauss the ferromagnetic wires together with the magnetic particles, by an amount proportional to the rate at which the generated alternating magnetic field revolves. As a result, it becomes easy to separate the particles from the wires, and cleaning of the filter can be facilitated by the centrifugal force acting on the particles and the increase in the fluid drag produced by the centrifugal force. In this case, the particles degauss at state (b) in FIG. 2(C).

Figure 3:
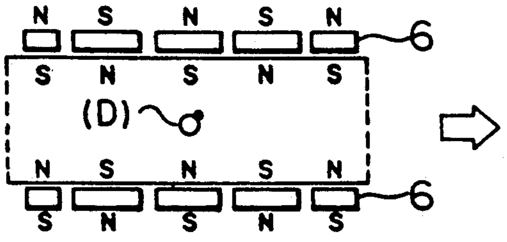
FIG. 3(A) is an explanatory drawing showing the interior of another example of a filter.
FIG. 3(B) is an explanatory drawing showing an another example of when a filter is cleaned.
FIG. 3(C) is a graph of another example of an alternating magnetic field.
FIGS. 3(D) and 3(E) each shows part of the views shown in FIGS. 3(A) and 3(B) respectively.
Figure 3:
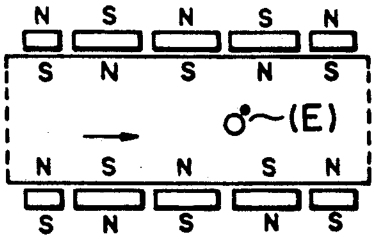
Figure 3:
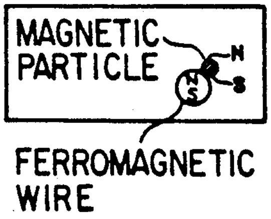
Figure 3:
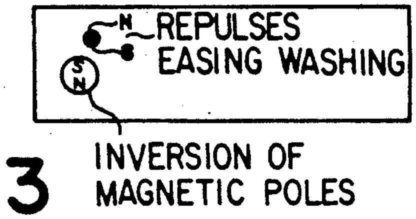
Figure 3:
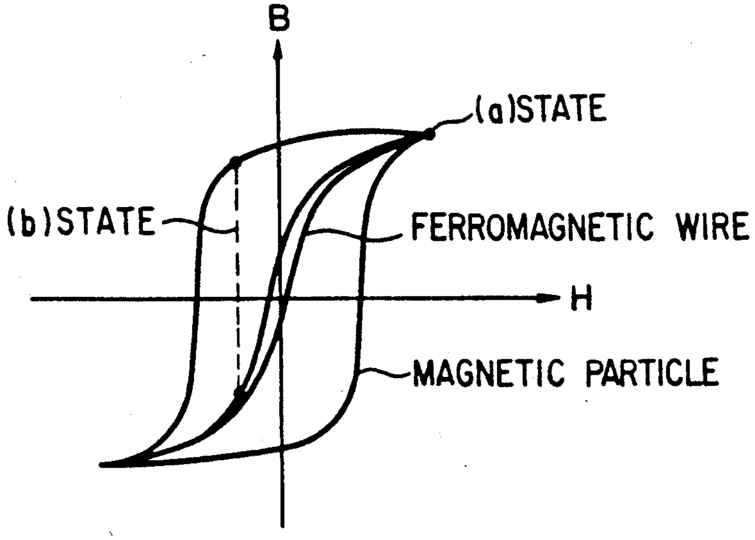

FIG. 3 illustrates the effect of the invention when the ferromagnetic small-gauge wires and the magnetic particles to be removed have different magnetic characteristics. During filtration, as shown by FIGS. 3(A) and 3(D), the magnetic particles are adhering to the ferromagnetic wires, a situation that is shown by state (a) in FIG. 3(C). As shown in FIGS. 3(B) and 3(E), at the start of the cleaning, by as much as the amount of the revolving of the alternating magnetic field generated there is a chance to separate the particles from the wires when the two repel each other. As a result, cleaning of the filter can be facilitated by the centrifugal force acting on the particles and the increase in the fluid drag produced by the centrifugal force. This situation is shown by state (b) in FIG. 3(C).

Figure 4:
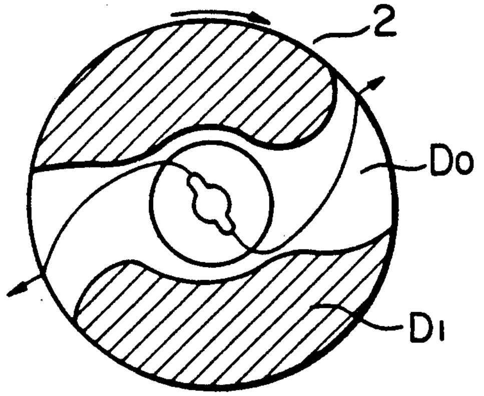
FIG. 4 is an explanatory drawing of the washing situation when washing fluid is supplied continuously (not intermittently)

As shown in FIG. 4, when the washing fluid is supplied to the filter in a continuous flow, the particles are removed in channels. The subsequent inflow of washing fluid flows into the channel offering the least resistance to the flow, preventing any improvement in washing efficiency. In the drawing, $D_0$ indicates a channel with lower particle density and $D_1$ the area with a higher particle density; the arrow a shows the direction of the flow of washing fluid.

Therefore, when washing fluid is supplied intermittently, rotating the filter when the fluid is not jetting out even when channels have formed will close the channels, so that the next spurt of fluid will provide an effective washing action.

Figure 5:
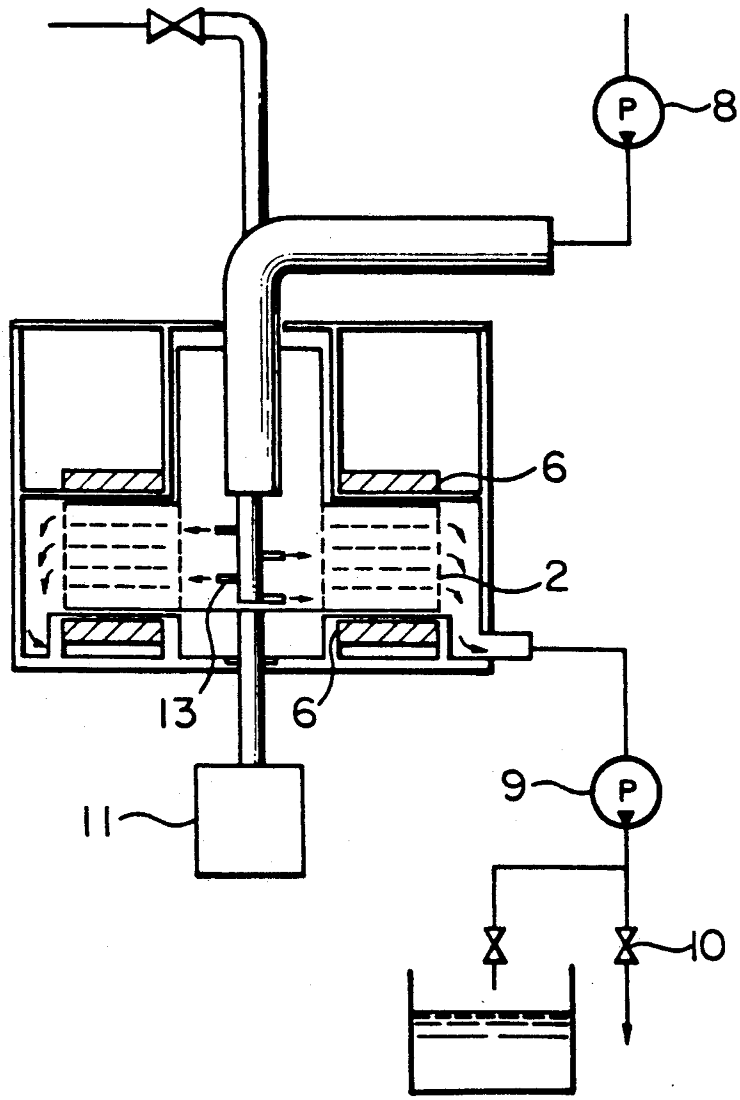
FIG. 5 is a schematic sectional elevation view of an example of the apparatus used.

FIG. 5 shows an example of an apparatus used in the invention.

Fluid containing magnetic particles to be filtered provided by a pump 8 enters the magnetic filter 2 and is passed through a magnetic field formed by permanent magnets 6 disposed above and below the filter.

As shown in FIGS. 1(*a*) and 1(*b*), a plurality of permanent magnets 6 are so disposed above and below the magnetic filter 2 that they are not revolved. When the fluid to be filtered passes through the thus magnetized filter, the large magnetic gradient generated by the ferromagnetic small-gauge wires that constitute the filter cause the particles to be removed from the fluid and become attached to the wires. The fluid thus cleaned is pumped back to the original tank, via valve 10, by a pump 9.

Examples of "ferromagnetic small-gauge wire" are materials such as steel wool, stainless steel fiber, and amorphous alloy fiber, and the like. Amorphous alloy fiber is a ferromagnetic small-gauge wire material formed by jetting a molten Fe alloy, such an Fe—Si alloy or an Fe—B alloy, through a nozzle into a cooling zone. It has excellent ferromagnetic properties.

A motor 11 is connected to the filter 2 to rotate the magnetic filter at a high speed, whereby the filter is washed by the centrifugal force of the rotation and the alternating magnetic field acting on the particles produced in the filter by the rotation, and a continuous or intermittent jet of washing fluid from a nozzle 13. The filter is, as pointed out hereinbefore, constituted by ferromagnetic small-gauge wires like those common in the art, and as heretofore done in the art, they are accommodated in a container of, for instance, a non-magnetic material. Thus, when the ferromagnetic wires constituting the filter have the same magnetic characteristics as the magnetic particles to be removed, the degaussing effect as shown in FIGS. 2(A)–2(E) provided by the alternating magnetic field enhances the washing effect. When the wires and particles have unlike magnetic characteristics, the washing efficiency is enhanced by the magnetic pole inversion effect provided by the alternating magnetic field as shown in FIGS. 3(A)–3(E). Washing efficiency is further enhanced by the intermittent jetting of the washing fluid, which prevents the formation of flow channels in the filter.

Figure 6:
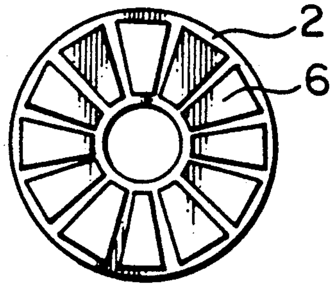
FIGS. 6(*a*)-6(*c*) are explanatory drawings of another example of the apparatus used.
Figure 6:
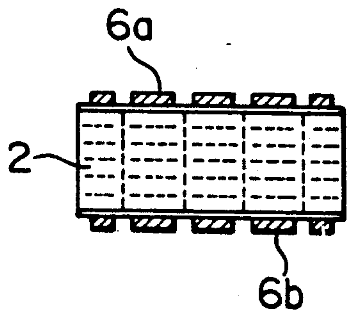
Figure 6:
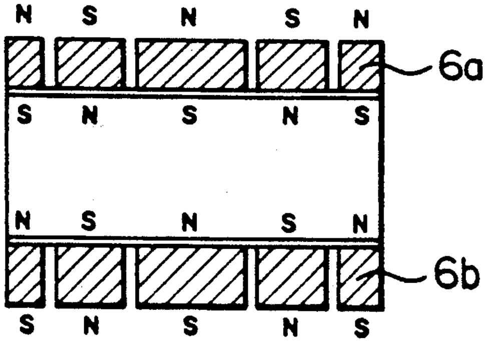

FIG. 6 shows another example of the invention, wherein one of the groups of upper and lower magnets is fixed and the other group is rotatable.

With reference to FIG. 6, magnets are provided above and below the magnetic filter 2. As the washing fluid flows between the upper magnets 6*a* and the lower magnets 6*b*, high-efficiency cleaning is possible because there is nothing obstructing the flow-path.

As shown in FIG. 6(*c*), the upper magnets 6*a* and the lower magnets 6*b*, are arranged so that the poles of adjacent magnets are unlike. In addition, the magnets 6*a* and 6*b* are arranged so that unlike poles face each other. Provided between the magnets 6*a* and 6*b* is a filter 2 constituted of ferromagnetic small-gauge wires. By producing a magnetic field in the wires, the magnetic particles are caused to adhere thereto.

With such an arrangement, when the lower magnets are rotated while the upper magnets remain fixed, the unlike polarity of the opposed upper and lower magnets will be changed to like polarity, with south poles facing south poles and north poles facing north poles.

With such a configuration, an alternating magnetic field acting on ferromagnetic wires provided between the upper and lower magnets produces a state of apparent non particle removal magnetism, enabling even higher-efficiency to be effected.

Figure 7:
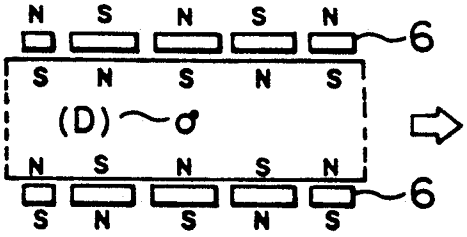
FIGS. 7(A)-7(E) are explanatory drawings of the operation of another example of the invention.
Figure 7:
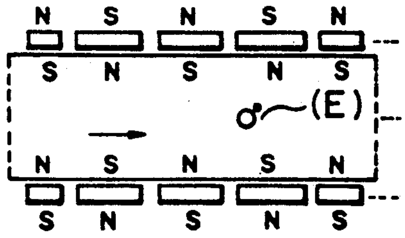
Figure 7:
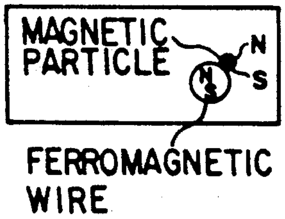
Figure 7:
Figure 7:
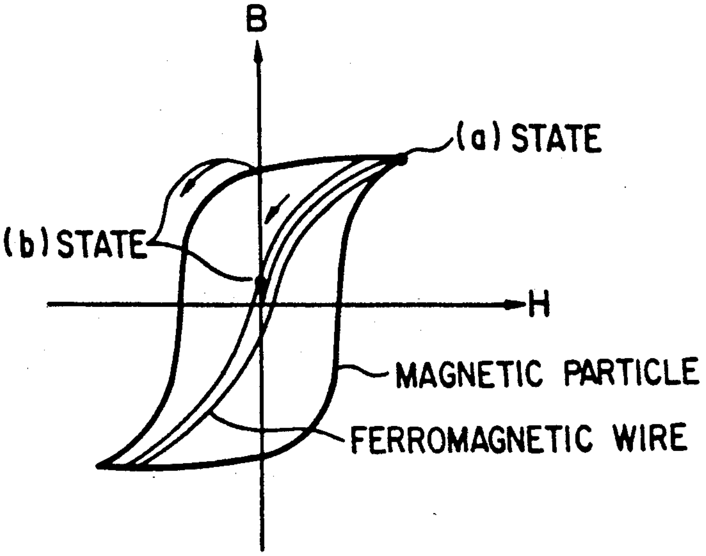

FIG. 7 shows the washing effect obtained with the example shown in FIG. 6. Namely, FIGS. 7(A) and 7(D) show the interior of the filter (when filtered out magnetic particles are adhering thereto). FIGS. 7(B) and 7(E) show the degaussing state of the ferromagnetic wires and the magnetic particles that accompanies the rotation of the filter and the lower magnets, during filter washing. That is, as shown in FIG. 7(C), state (a) is when the magnetic parts are adhering, and during filter washing it becomes state (b) by an amount proportional to the rate at which the generated alternating magnetic field revolves, and the external magnetic field is removed.

In this state, the magnetization of the ferromagnetic wires disappears and the magnetization of the magnetic particles is reduced.

At this point, as mentioned above, high-efficiency filter washing can be effected by the centrifugal force generated by the filter rotation and the pulsed supply of washing fluid.

Figure 8:
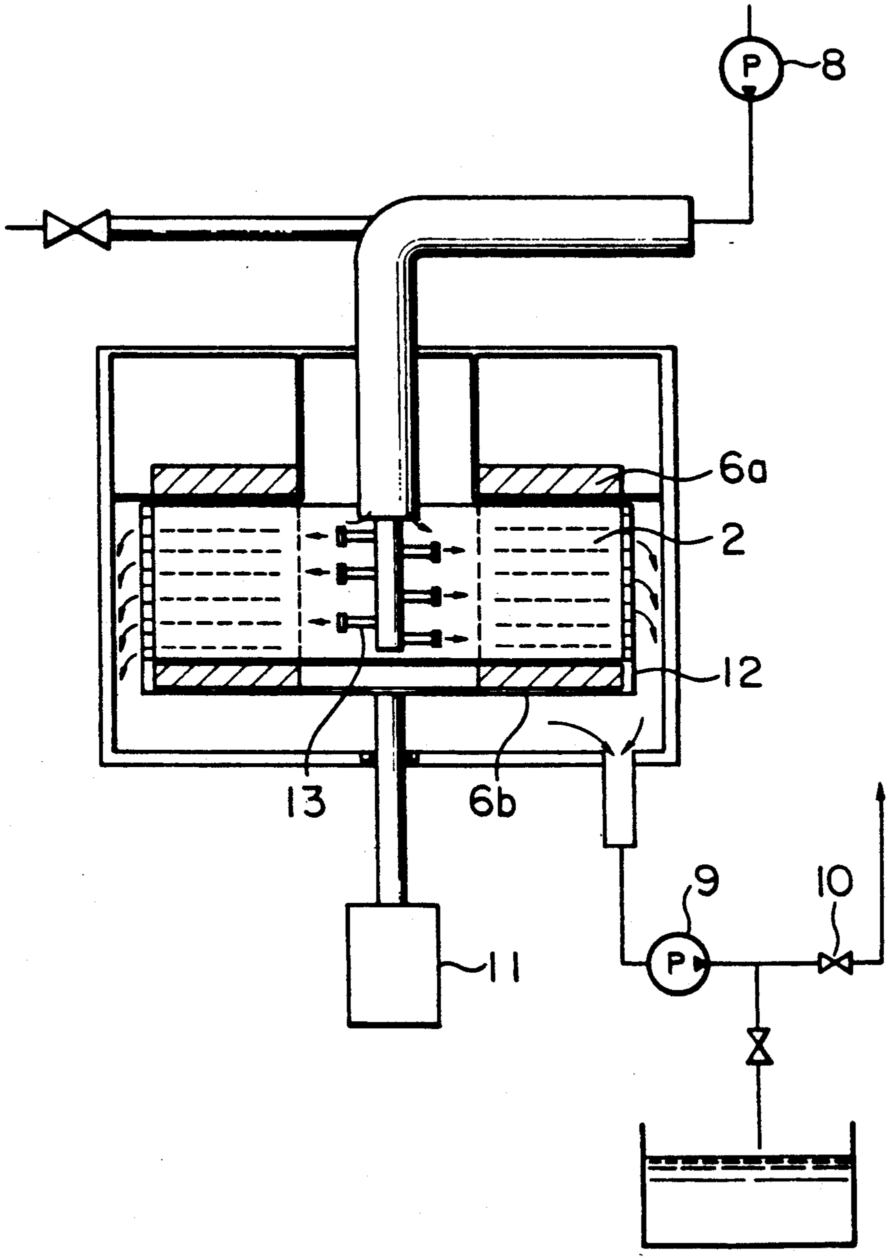
FIG. 8 is a schematic sectional elevation view of another example of an apparatus for carrying out the method of the invention.

FIG. 8 shows an example of an apparatus of the cleaning system of the invention.

Fluid containing the magnetic particles to be filtered out is delivered by a pump 8 into the apparatus. The fluid is passed through a magnetic field formed by permanent magnets 6 disposed above and below the filter 2. In the course of this filtering, a large magnetic gradient generated by a filter constituted of ferromagnetic small-gauge wires causes the particles to be captured by the wires. The fluid thus cleaned is pumped back to its original tank, via valve 10, by a pump 9. A plurality of permanent magnets 6 are disposed above and below the magnetic filter 2, and the upper magnets 6*a* are firmly fixed in place, in the same manner as shown in FIG. 6.

The lower magnets 6*b* are provided on a filter unit 12 which includes filter 2. A motor 11 is connected to the filter unit 12 to rotate the magnetic filter unit 12 at a high speed and a jet of washing fluid is produced from nozzles 13 for the washing.

EXAMPLE 1

After rolling oil used in a cold-rolling process has been cleaned by passing it through a magnetic filter to filter out magnetic particles contained in the fluid, the filter was washed using the method of this invention.

Figure 9:
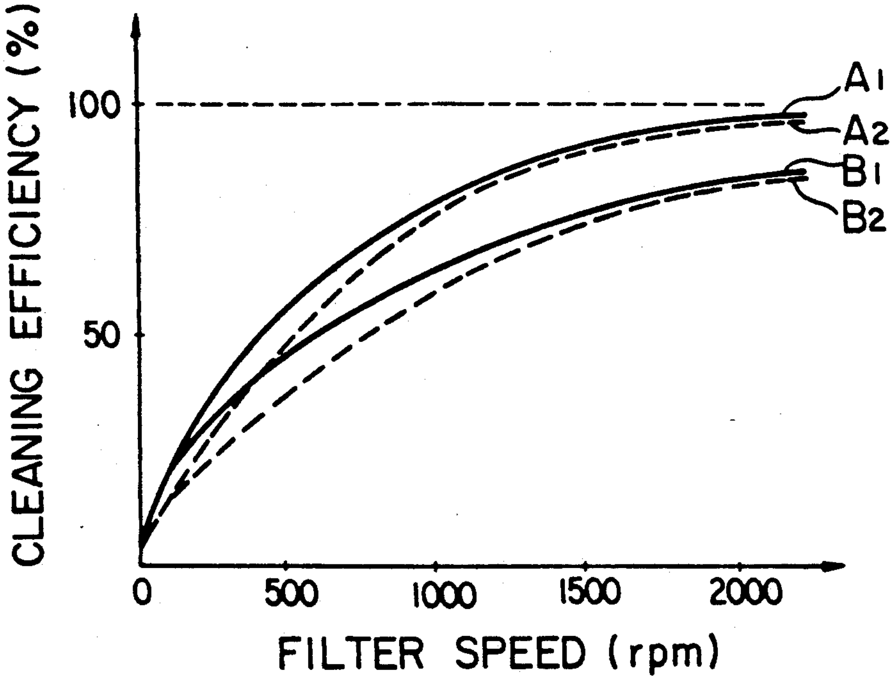
FIGS. 9 and 10 are curves showing the effect of implementing the method of the invention.

Washing was conducted for 5 minutes at a constant fluid flow-rate of 20 liters/minute. The results are shown in FIG. 9. In the figure, curves A and B show the results achieved by the method of this invention; curve A the result of washing the filter while keeping both the upper and the lower magnets fixed, and curve B the result of washing the filter while keeping the upper magnets fixed and rotating the lower magnets.

Washing efficiency is as follows:

Washing efficiency (%)=The amount of particles discharged/the amount of particles removed.

The curves with subscript 1 show the results when the ferromagnetic small-gauge wires and the particles had different magnetic characteristics, and those with subscript 2 show the results when the magnetic characteristics were the same.

At a filter speed of 2,000 rpm the filter washing effect obtained with the method of the present invention is good, being substantially unaffected by the magnetic characteristics of the ferromagnetic small-gauge wires.

Figure 10:
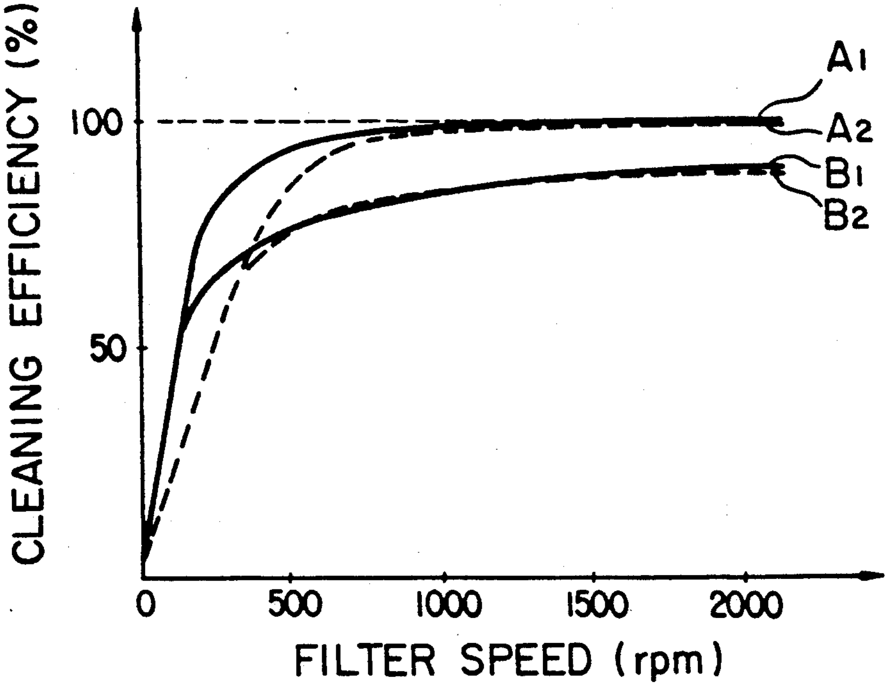

FIG. 10 shows the washing results obtained when washing fluid was supplied intermittently (at 20 liters/-minute during actual delivery) for a washing time of 5 minutes. The results show the relationship between filter speed (rpm) and washing efficiency. The experimental conditions ($A_1$, $A_2$, $B_1$, $B_2$) are the same as in FIG. 9.

These results show that the filter washing effect obtained with the method of the present invention is good. Even when compared with the results obtained using a continuous delivery of washing fluid (see FIG. 9), filter washing is substantially perfect from filter speeds as low as 300 rpm.

Also, with respect to whether the ferromagnetic wires constituting the filter have the same or different magnetic characteristics from the magnetic particles to be removed, when the wires and particles have different magnetic characteristics, quite a high washing efficiency can be obtained at even lower speeds (i.e., below 300 rpm).

Therefore, by giving the ferromagnetic small-gauge wires that constitute the filter element magnetic characteristics that are different from those of the magnetic particles, and also by using an intermittent delivery of washing fluid, a high washing efficiency can be obtained at relatively low filter speeds and with a small amount of washing fluid, from which it can be seen that the method of the invention is advantageous in terms of both cost and washing efficiency.

EXAMPLE 2

Rolling oil used in a cold-rolling process was cleaned using the method of the present invention.

Washing was conducted for 5 minutes at a washing-fluid flow-rate of 10 liters/minute and a washing filter speed of 1,300 rpm, and the quantity of steel particles that remained adhered to the magnetic filter was measured. The results are shown in Table 1.

TABLE 1

| | Magnet location and rotation format | Particles remaining on the magnetic filter |
|---|---|---|
| Line 1 | Rotation of upper and lower magnets | 500 ppm |
| Line 2 | Fixing upper magnets and rotating lower magnets | 5 ppm |
| Line 3 | Rotation of upper magnets and fixing of lower magnets | 6 ppm |
| Line 4 | Fixing upper and lower magnets | 1 ppm |
| Partitioning the filter and providing the magnets on the partition | | 1000 ppm |

Line 1 shows the results when the magnetic filter and the upper and lower magnets were all rotated in the same direction. Line 2 shows the results when the magnetic filter was rotated with the lower magnets, while the upper magnets were kept fixed. Line 3 shows the results when the magnetic filter and upper magnets were revolved together and the lower magnets were fixed. Line 4 shows the results when magnetic filter was rotated, while the upper and lower magnets were kept fixed.

As can be seen from Line 1 in Table 1, washing efficiency was increased when washing was performed using a rotating filter with an alternating magnetic field produced by fixed magnets provided above and below the magnetic filter. Also, as shown by Line 2 and Line 3, washing efficiency was further increased when performed by fixing one set of magnets and generating an attraction-repellent magnetic field by rotation of the other set of magnets.

What is claimed is:

1. A method of washing a magnetic filter constituted by ferromagnetic small-gauge wires and having a longitudinal axis and opposite ends, by removing from the magnetic filter magnetic particles clinging thereto, comprising:
establishing a magnetic field through the filter and which alternates in polarity in a direction around said longitudinal axis and which extends in a direction parallel to said longitudinal axis; rotating the magnetic filter with respect to said magnetic field about said longitudinal axis; and
jetting washing fluid through the magnetic filter between the respective opposite ends of the filter in a direction transverse to said longitudinal axis while rotating the magnetic filter.

2. A method as claimed in claim 1 in which said step of establishing the magnetic field comprises disposing a plurality of magnets adjacent each of the opposite ends of the filter with the magnets in each plurality disposed in spaced relation around said longitudinal axis and with the polarities of adjacent magnets opposite to each other.

3. A method as claimed in claim 2 in which one of the pluralities of magnets is fixed relative to the filter and the other plurality of magnets is rotated relative to said one of the pluralities of magnets.

4. A method as claimed in claim 1 in which the step of jetting the washing fluid comprises intermittently jetting the washing fluid.

* * * * *